United States Patent
Ertzsaenger et al.

(10) Patent No.: US 6,894,404 B2
(45) Date of Patent: May 17, 2005

(54) METHOD AND DEVICE FOR OVERVOLTAGE PROTECTION IN DUAL-VOLTAGE VEHICLE ELECTRICAL SYSTEMS

(75) Inventors: Frank Ertzsaenger, Wolfsburg (DE); Torsten Zawade, Peine (DE); Peter Konrad, Braunschweig (DE); Klaus Revermann, Borensdorf (DE)

(73) Assignee: Volkswagen AG, Wolfsburg (DE)

( * ) Notice: Subject to any disclaimer, the term of this patent is extended or adjusted under 35 U.S.C. 154(b) by 114 days.

(21) Appl. No.: 10/168,412

(22) PCT Filed: Dec. 18, 2000

(86) PCT No.: PCT/EP00/12908

§ 371 (c)(1),
(2), (4) Date: Sep. 18, 2002

(87) PCT Pub. No.: WO01/47084

PCT Pub. Date: Jun. 28, 2001

(65) Prior Publication Data

US 2003/0060947 A1 Mar. 27, 2003

(30) Foreign Application Priority Data

Dec. 20, 1999 (DE) .......................... 199 61 435

(51) Int. Cl.⁷ ............................. H02J 7/00; H02G 3/00
(52) U.S. Cl. ..................................... 307/10.1; 320/104
(58) Field of Search ........................ 307/10.1; 320/104, 320/103, 121, 138; 322/37; 361/91.1, 91.6

(56) References Cited

U.S. PATENT DOCUMENTS

| | | | |
|---|---|---|---|
| 3,108,205 A | 10/1963 | Bancroft | 361/90 |
| 5,402,056 A | * 3/1995 | Ketterling | 320/140 |
| 6,181,101 B1 | * 1/2001 | Arai et al. | 320/104 |

* cited by examiner

Primary Examiner—Pia Tibbits
(74) Attorney, Agent, or Firm—Kenyon & Kenyon

(57) ABSTRACT

A method and a device are for overvoltage protection in dual-voltage vehicle electrical systems that have a different level of voltage. A switching element is positioned in at least one branch of the vehicle electrical system on the higher voltage level, and a voltmeter unit is located in the vehicle electrical system on the lower voltage level. The switching element is controlled by the voltmeter.

11 Claims, 1 Drawing Sheet

METHOD AND DEVICE FOR OVERVOLTAGE PROTECTION IN DUAL-VOLTAGE VEHICLE ELECTRICAL SYSTEMS

FIELD OF THE INVENTION

The present invention relates to a method and device for overvoltage protection in dual-voltage vehicle electrical systems.

BACKGROUND INFORMATION

Dual-voltage vehicle electrical systems of this type are conventional in automotive engineering for example. Due to the increasing number of electric consumers, in many cases, one single voltage supply no longer suffices. Furthermore, the electric consumers used require higher operating voltage and/or higher electric power so that dual-voltage vehicle electrical systems with different voltage levels of 14V and 42V for example have been developed. It is also conventional to connect these vehicle electrical systems by way of a dc.-dc. converter so that they can be supplied via a common generator for example. A principle problem of such type dual-voltage vehicle electrical systems is that the electric consumers in the vehicle electrical system with the low voltage level have to be protected from static overvoltage conditions due to a short between the two vehicle electrical systems. This protection can be achieved for example in that the electric consumers in the vehicle electrical system with the low voltage level are provided with corresponding overvoltage protection elements that are designed to match the voltage in the other vehicle electrical system. The disadvantage of this arrangement is that all of the electric consumers used in vehicle electrical systems with a low voltage level would have to be modified.

It is an object of the present invention to provide a device and a method allowing a greater ease of protecting the electric consumers in the vehicle electrical system with the lower voltage level from overvoltage conditions due to the other vehicle electrical system.

SUMMARY

The above and other beneficial objects of the present invention are achieved by providing a device and a method as described herein.

For this purpose, a switching element is positioned in at least one branch of the vehicle electrical system on the higher voltage level and a voltmeter unit is located in the vehicle electrical system on the lower voltage level, the voltmeter unit being capable of switching off voltage branches in the vehicle electrical system with the higher voltage level by way of the switching element(s) upon detecting an overvoltage condition, thereby eliminating the cause of the overvoltage condition.

The switching elements may be arranged either in all of the branches which are non-critical with regard to safety or only in those branches in which there is, on account of the wiring, a serious risk of shorts with the other vehicle electrical system.

The voltmeter unit may be connected to the switching elements either via control lines or via a CAN bus or other bus systems.

In another example embodiment in which the two vehicle electrical systems are direct-coupled together by a dc.-dc. converter, the voltmeter unit may be integrated into the dc.-dc. converter.

The switching elements may be configured as semiconductor switching elements, e.g., as MOSFETs.

The method includes measuring the voltage in the vehicle electrical system with the lower voltage level and in successively switching off, upon detecting an overvoltage condition, branches in the vehicle electrical system with the higher voltage by the switching elements, this step being performed until no overvoltage condition is detected any longer.

Particularly in the case of branches that have to be protected separately, like for example the left and right side of the vehicle lighting, the branches are switched off one after the other, the one branch being connected again prior to switching off the other one, so that there is always one branch remaining operative. For, if the overvoltage condition is still detected after the first branch has been switched off, this branch is not the cause of the overvoltage condition and accordingly, this branch may be connected again.

The present invention will be described more explicitly below with reference to an example embodiment.

BRIEF DESCRIPTION OF THE DRAWING

The FIGURE is a circuit diagram of a dual-voltage vehicle electrical system with overvoltage protection.

DETAILED DESCRIPTION

Figure 1:
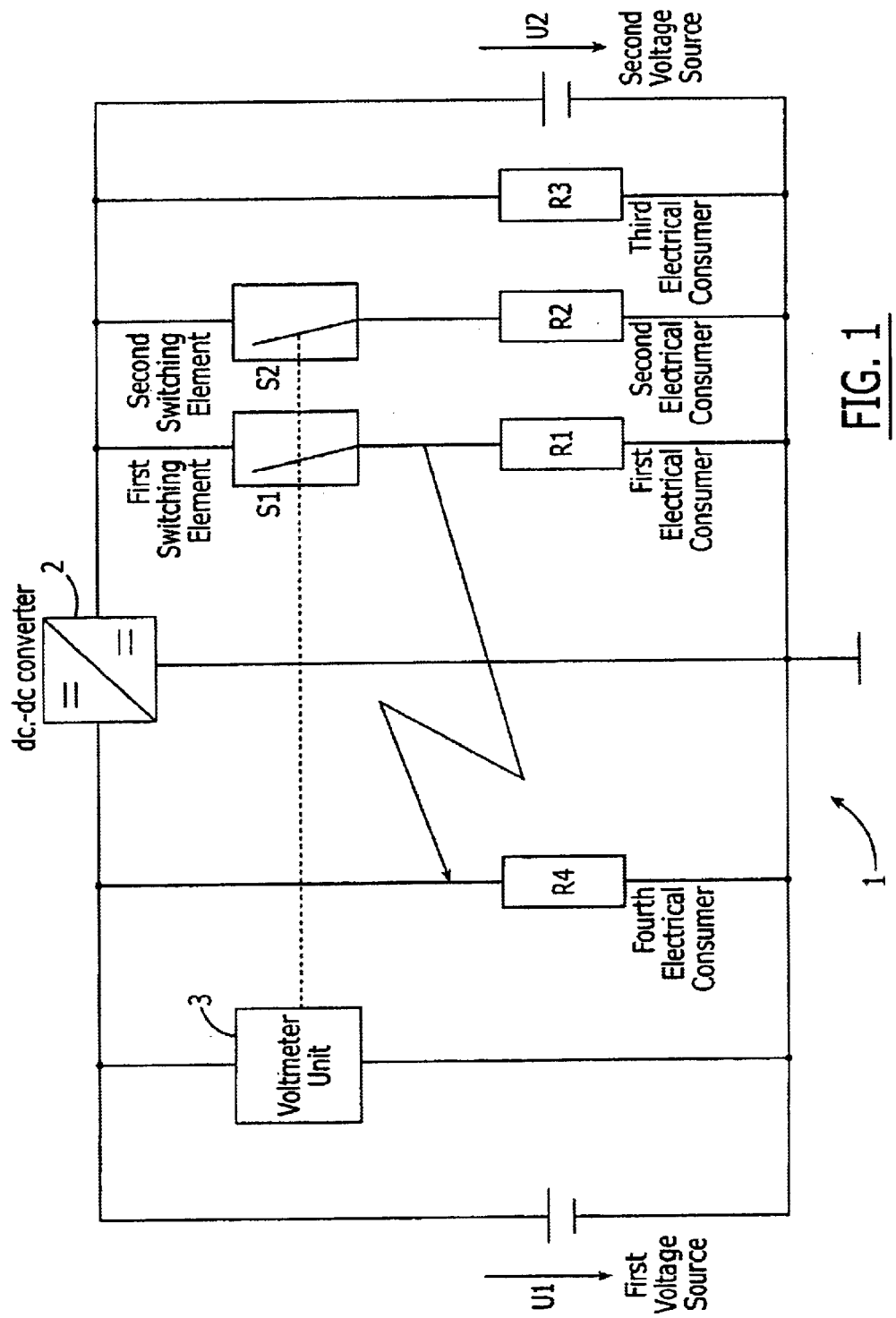

The dual-voltage vehicle electrical system 1 includes a first voltage source U1 and of a second voltage source U2, whereby U2>U1. A dc.-dc. converter 2, which allows the vehicle electrical systems to be connectable despite the different voltage levels, is arranged between the two voltage sources U1, U2. In different branches, first electric consumers R4 are arranged in the first vehicle electrical system with the voltage source U1 and second electric consumers R1–R3 are arranged in the second vehicle electrical system with the voltage source U2. A respective one of the switching elements S1 and S2 are arranged in the branch of the electric consumers R1 and R2. A voltmeter unit 3 measuring the voltage in the first vehicle electrical system is arranged in the first vehicle electrical system. The voltmeter unit 3 may be incorporated into the dc.-dc. converter 2. The voltmeter unit 3 is connected to the control inputs of the switching elements S1 and S2. The electric consumers R3, in the branch of which no switching element is arranged, are for example safety critical consumers such as an electrical steering system or an electrical brake system, which are not allowed to be switched off. Furthermore, no switching elements need to be arranged in branches which, in the arrangement, are located far from the first vehicle electrical system.

The voltmeter unit 3 continuously measures the voltage in the first vehicle electrical system. If, for example, the branch of consumer R1 and that of consumer R4 short circuit, the voltmeter unit 3 detects the overvoltage condition in the first vehicle electrical system. Thereupon, the voltmeter unit 3 switches the first switching element S1 so that the latter opens or closes respectively, switching off the branch of R1. In the example embodiment illustrated, the cause of the overvoltage condition is thus eliminated.

If, however, the voltmeter unit 3 still measures an overvoltage condition, the next switching element S2 is opened until there is no overvoltage condition any longer. The previously opened switching element S1 may hereby be closed first prior to opening the switching element S2. This manner to proceed may be particularly convenient in the case of consumers that have to be protected separately, since there is always one consumer remaining active.

What is claimed is:

1. A device for overvoltage protection in a dual-voltage vehicle electrical system having different voltage levels, comprising:
   a switching element arranged in at least one branch of the vehicle electrical system on a higher voltage level; and
   a voltmeter unit positioned and arranged in the vehicle electrical system on a lower voltage level, the voltmeter unit configured to control the switching element;
   wherein a respective switching element is arranged in each of at least two voltage branches adapted to be successively switched off by the voltmeter unit in accordance with detection by the voltmeter unit of an overvoltage condition in the vehicle electrical system with the lower voltage level until the voltmeter unit no longer detects the overvoltage condition.

2. The device according to claim 1, wherein a switching element is arranged in each branch of the vehicle electrical system that is non-critical with regard to safety of the vehicle.

3. The device according to claim 1, further comprising a bus system, the voltmeter unit connected to the switching elements via the bus system.

4. The device according to claim 1, further comprising a dc-dc converter, two electrical systems of the vehicle connected via the dc-dc converter.

5. The device according to claim 4, wherein the voltmeter unit is integrated in the dc-dc converter.

6. The device according to claim 1, wherein the switching elements include semiconductor switching elements.

7. The device according to claim 1, wherein the switching elements are configured as MOSFETs.

8. A method for overvoltage protection in a dual-voltage electrical system having different voltage levels, comprising the steps of:
   measuring a voltage in the vehicle electrical system having a lower voltage level; and
   successively switching off voltage branches in the vehicle electrical system with a higher voltage level upon detection of an overvoltage condition in the vehicle electrical system having the lower voltage level until the overvoltage condition is no longer detected.

9. The method according to claim 8, further comprising the step of reconnecting a switched off voltage branch if an overvoltage condition is still detected after the voltage branch has been switched off.

10. The method according to claim 9, wherein the switched off voltage branch is reconnected in the reconnecting step prior to switching off a next voltage branch in the switching off step.

11. The method according to claim 8, further comprising the step of simultaneously switching off and successively reconnecting certain voltage branches.

* * * * *